(12) United States Patent
Song et al.

(10) Patent No.: US 11,749,827 B2
(45) Date of Patent: Sep. 5, 2023

(54) METHOD FOR IRON PREFORMATION IN REDOX FLOW BATTERIES (71) Applicant: ESS TECH, INC., Wilsonville, OR (US)

(72) Inventors: Yang Song, West Linn, OR (US); Brady Thompson, Canby, OR (US); Timothy J. McDonald, Portland, OR (US)

(73) Assignee: ESS TECH, INC., Wilsonville, OR (US)

( * ) Notice: Subject to any disclaimer, the term of this patent is extended or adjusted under 35 U.S.C. 154(b) by 283 days.

(21) Appl. No.: 17/080,702

(22) Filed: Oct. 26, 2020

(65) Prior Publication Data
US 2021/0135270 A1 May 6, 2021

Related U.S. Application Data (60) Provisional application No. 62/929,634, filed on Nov. 1, 2019.

(51) Int. Cl.
*H01M 8/18* (2006.01)
*H01M 8/04537* (2016.01)
*H01M 8/04858* (2016.01)
*H01M 4/52* (2010.01)

(52) U.S. Cl.
CPC .......... *H01M 8/188* (2013.01); *H01M 4/521* (2013.01); *H01M 8/04604* (2013.01); *H01M 8/04895* (2013.01)

(58) Field of Classification Search
CPC ............. H01M 8/188; H01M 8/04604; H01M 8/04895; H01M 4/521
See application file for complete search history.

(56) References Cited

U.S. PATENT DOCUMENTS

| 2014/0057141 | A1 | 2/2014 | Mosso et al. |
| 2014/0227574 | A1 | 8/2014 | Savinell et al. |
| 2015/0255824 | A1 | 9/2015 | Evans et al. |
| 2016/0293992 | A1* | 10/2016 | Song .................... H01M 8/0693 |
| 2018/0316037 | A1* | 11/2018 | Song ................. H01M 8/04932 |

FOREIGN PATENT DOCUMENTS

JP 2010092635 A 4/2010

OTHER PUBLICATIONS

ISA Korean Intellectual Property Office, International Search Report and Written Opinion Issued in Application No. PCT/US2020/057406, dated Feb. 18, 2021, WIPO, 12 pages.

* cited by examiner

*Primary Examiner* — Anca Eoff
(74) *Attorney, Agent, or Firm* — McCoy Russell LLP (57) ABSTRACT Methods and systems are provided for iron preformation in a redox flow battery. In one example, a method may include, in a first condition, discharging and then charging the redox flow battery, and in a second condition, charging the redox flow battery including preforming iron metal at a negative electrode of the redox flow battery, and thereafter entering an idle mode of the redox flow battery including adjusting one or more electrolyte conditions. In some examples, each of preforming the iron metal and adjusting the one or more electrolyte conditions may increase a battery charge capacity to greater than a threshold battery charge capacity.

8 Claims, 6 Drawing Sheets

METHOD FOR IRON PREFORMATION IN REDOX FLOW BATTERIES

CROSS REFERENCE TO RELATED APPLICATIONS

The present application claims priority to U.S. Provisional Application No. 62/929,634, entitled "METHOD FOR IRON PREFORMATION IN REDOX FLOW BATTERIES," and filed on Nov. 1, 2019. The entire contents of the above-identified application are hereby incorporated by reference for all purposes.

FIELD

The present description relates generally to methods and systems for iron preformation in a redox flow battery.

BACKGROUND AND SUMMARY

Redox flow batteries are suitable for grid-scale storage applications due to their capability for scaling power and capacity independently, as well as for charging and discharging over thousands of cycles with reduced performance losses in comparison to conventional battery technologies. An all-iron hybrid redox flow battery is particularly attractive due to incorporation of low-cost, earth-abundant materials. In general, iron redox flow batteries (IFBs) rely on iron, salt, and water for electrolyte, thus including simple, earth-abundant, and inexpensive materials, and eliminating incorporation of harsh chemicals and reducing an environmental footprint thereof.

The IFB may include a positive electrode where a redox reaction occurs and a negative electrode where ferrous iron ($Fe^{2+}$) in the electrolyte may be reduced and plated. Various side reactions may compete with the $Fe^{2+}$ reduction, including proton reduction, iron corrosion, and iron plating oxidation:

$H^+ + e^- \leftrightarrow \frac{1}{2}H_2$ (proton reduction)      (1)

$Fe^0 + 2H^+ \leftrightarrow Fe^{2+} + H_2$ (iron corrosion)      (2)

$2Fe^{3+} + Fe^0 \leftrightarrow 3Fe^{2+}$ (iron plating oxidation)      (3)

As most side reactions occur at the negative electrode, IFB cycling capabilities may be limited by available iron plating on the negative electrode. Attempts to ameliorate iron plating loss have focused on catalytic electrolyte rebalancing to address hydrogen gas generation from equations (1) and (2) via equation (4):

$Fe^{3+} + \frac{1}{2}H_2 \rightarrow Fe^{2+} + H^+$ (electrolyte rebalancing)      (4)

However, the inventors herein have recognized that, even with reduced hydrogen gas generation, ferric iron ($Fe^{3+}$) may remain in greater amounts than the plated iron, limiting overall battery capacity. Thus, it is desirable to operate IFBs with increased plating capacity.

In one example, the issues described above may be addressed by method for a redox flow battery, the method including, in a first condition, discharging the redox flow battery and then charging the redox flow battery without entering an idle mode of the redox flow battery, and in a second condition, charging the redox flow battery including preforming an iron plating amount at a negative electrode of the redox flow battery, and thereafter entering the idle mode including adjusting each of an electrolyte pH and an electrolyte state of charge (SOC) imbalance. In some examples, adjusting each of the electrolyte pH and the electrolyte SOC imbalance may include decreasing a concentration of $Fe^{3+}$ in an electrolyte. In this way, iron plating at the negative electrode may be preformed and subsequent iron plating loss may be mitigated so as to optimize electrochemical performance during battery cycling.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
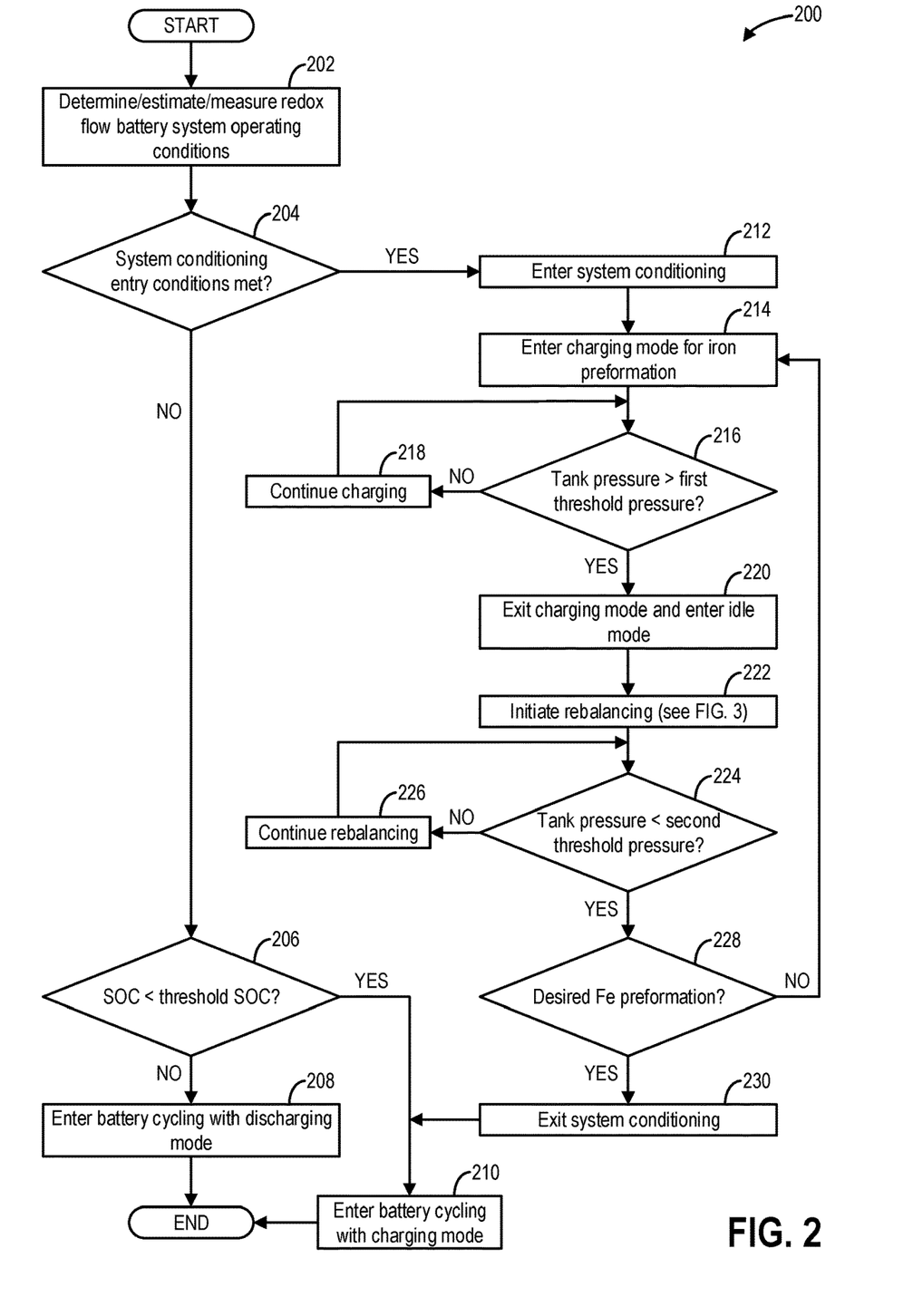
FIG. 2 shows a flow chart of a method for iron preformation at a negative electrode of the redox flow battery system.
Figure 3:
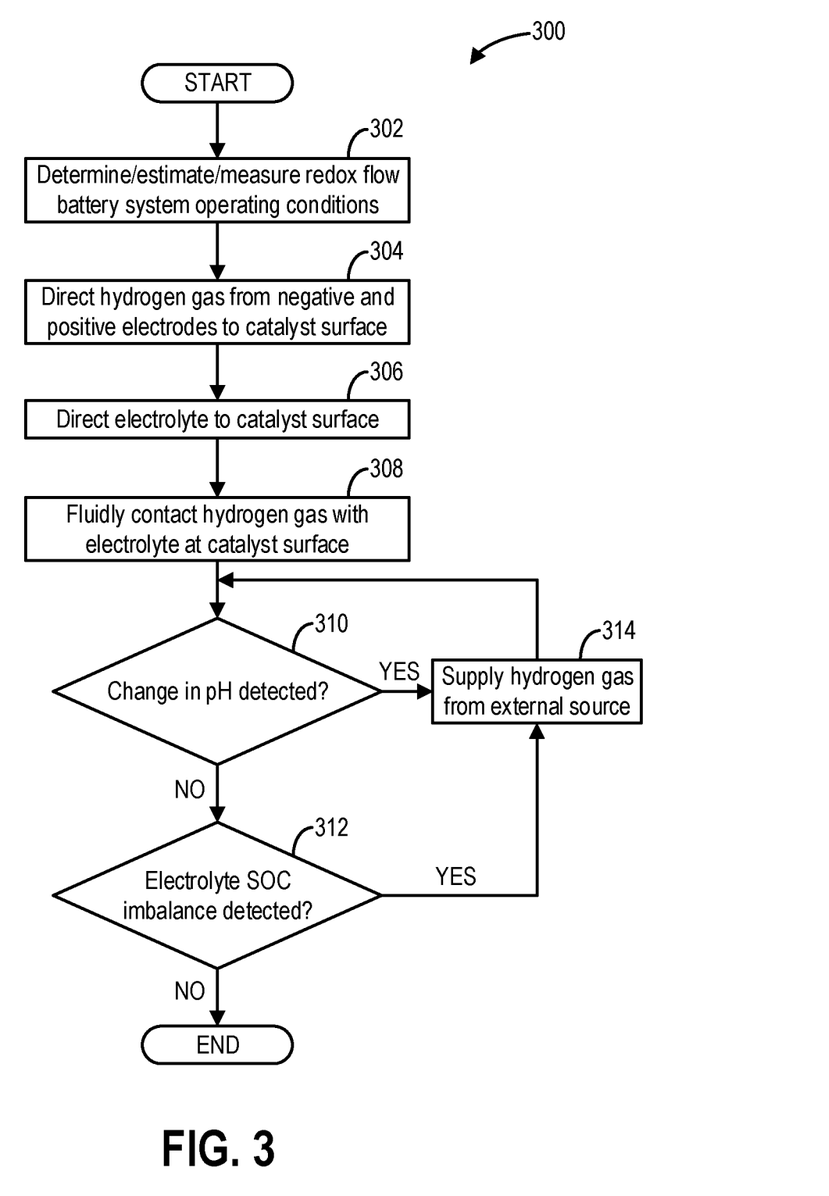
FIG. 3 shows a flow chart of a method for rebalancing electrolytes in the redox flow battery system.
Figure 4:
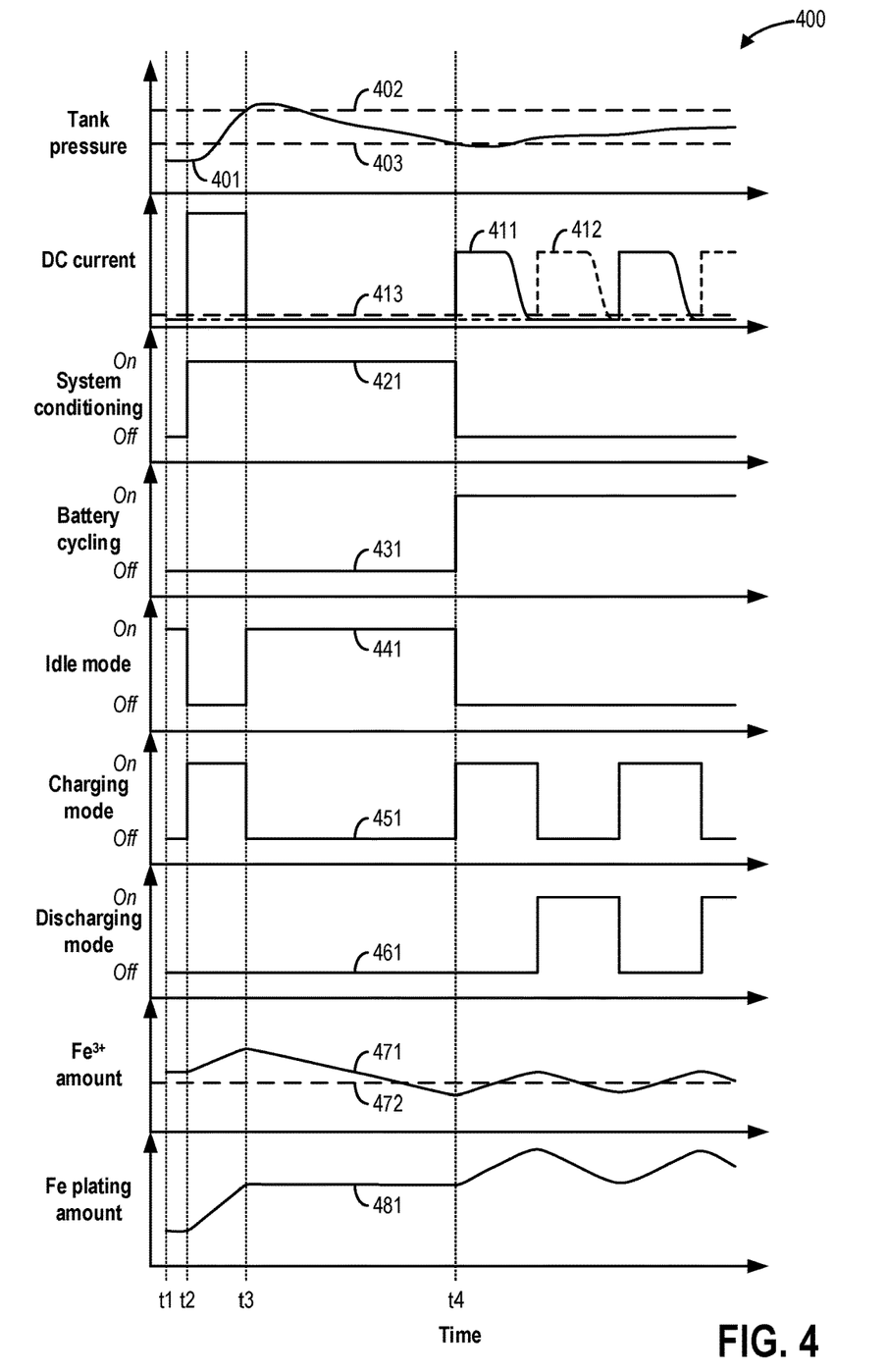
FIG. 4 shows a prophetic timeline of a first example of battery cycling following iron preformation at the negative electrode of the redox flow battery system.
Figure 5:
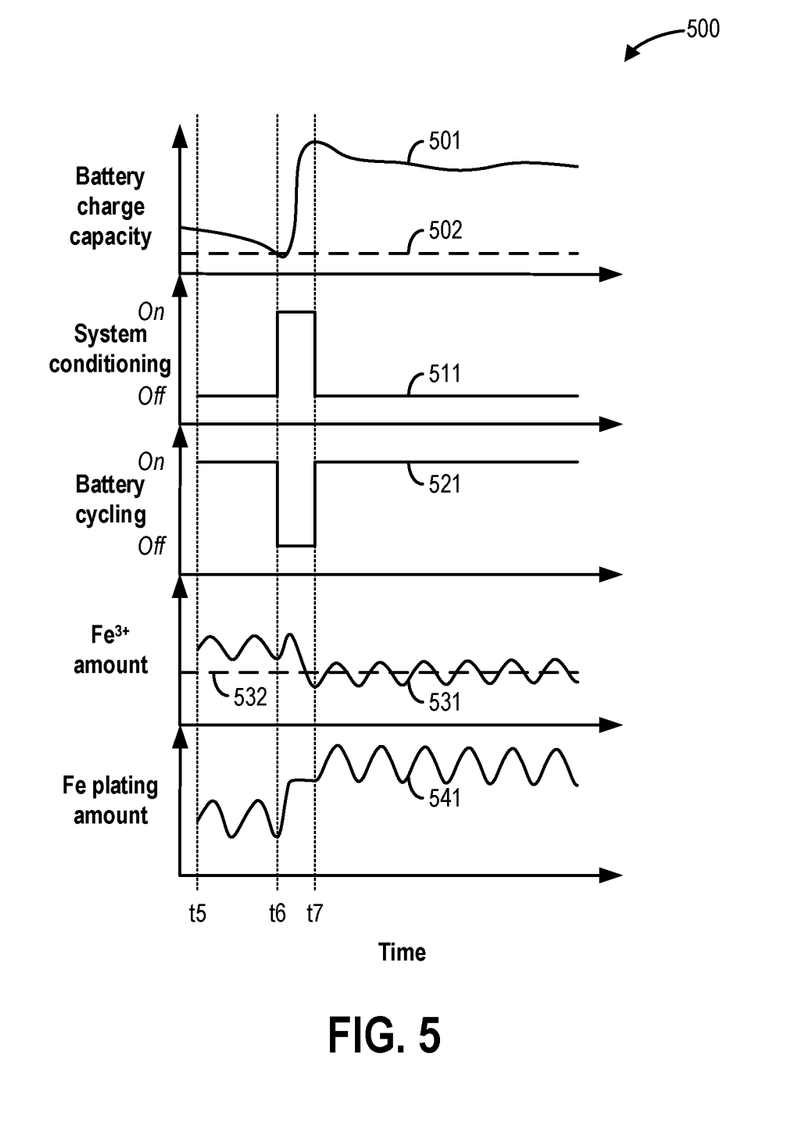
FIG. 5 shows a prophetic timeline of a second example of battery cycling following iron preformation at the negative electrode of the redox flow battery system.

The following description relates to systems and methods for iron preformation at a negative electrode of a redox flow battery. The redox flow battery is shown in a schematic diagram in FIG. 1 with an integrated multi-chamber tank having separate positive and negative electrolyte chambers. In some examples, the redox flow battery may be an all-iron flow battery (IFB) utilizing iron redox chemistry at both a positive electrode and the negative electrode of the IFB. The electrolyte chambers may be coupled to one or more battery cells, each cell including the negative electrode and the positive electrode. Iron may be preformed on the negative electrode during system conditioning, thereby increasing capacity of the IFB during battery cycling. One example method for such iron preformation is depicted at FIG. 2, where an idle mode of the IFB may be employed during system conditioning to plate iron at the negative electrode prior to battery cycling. Electrolyte rebalancing, such as in the example method of FIG. 3, may further be utilized during system conditioning to account for hydrogen gas generation. FIGS. 4 and 5 depict example timelines for system conditioning and subsequent battery cycling. Voltage over battery cycling following iron preformation is further depicted at the example plots of FIGS. 6A and 6B.

Hybrid redox flow batteries are redox flow batteries which may be characterized by deposition of one or more electroactive materials as a solid layer on an electrode. Hybrid redox flow batteries may, for instance, include a chemical species which may plate via an electrochemical reaction as a solid on a substrate throughout a battery charge process. During battery discharge, the plated species may ionize via a further electrochemical reaction, becoming soluble in the electrolyte. In hybrid redox flow battery systems, a charge capacity (e.g., a maximum amount of energy stored) of the redox flow battery may be limited by an amount of metal plated during battery charge and may accordingly depend on an efficiency of the plating system as well as volume and surface area available for plating.

Figure 1:
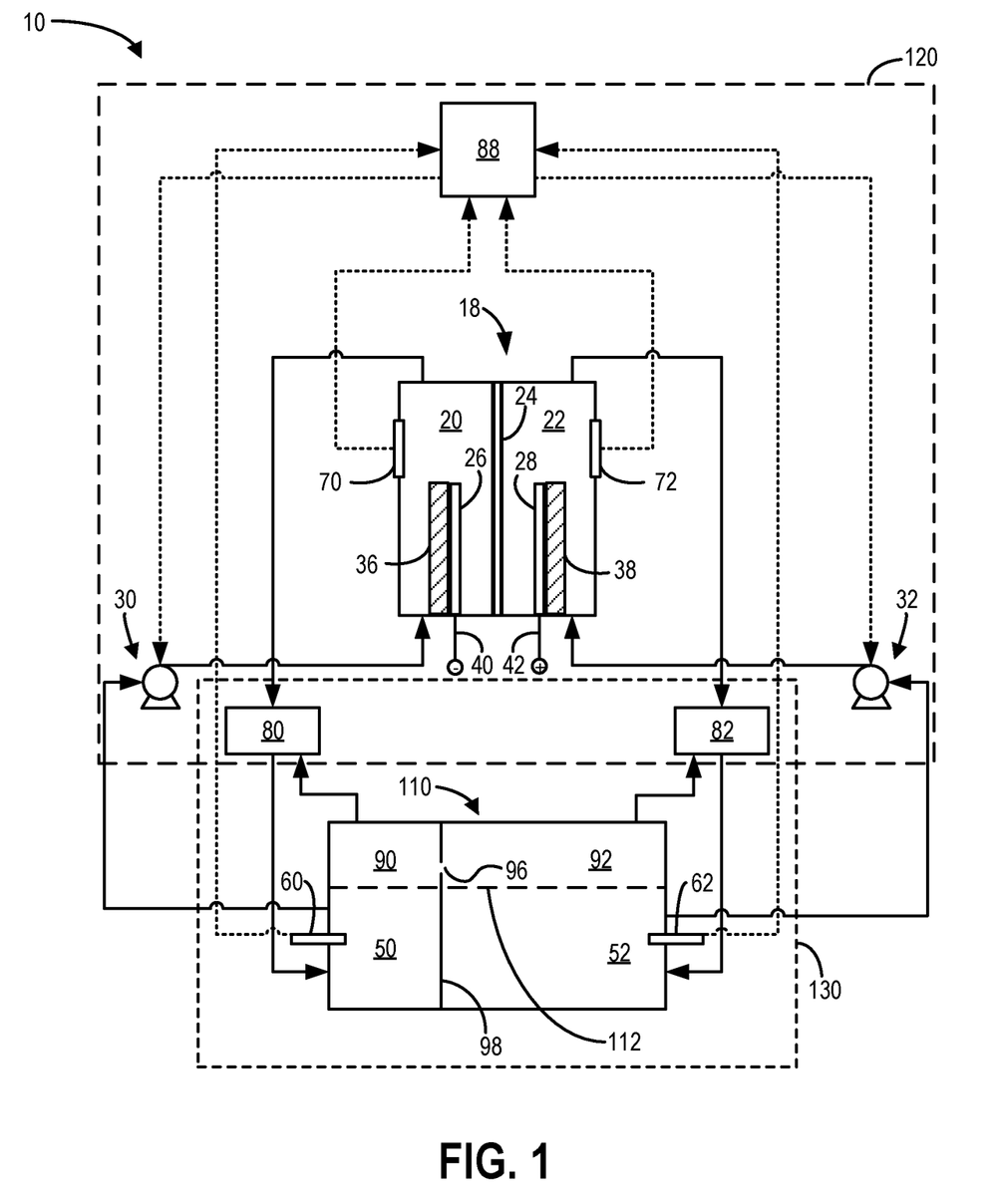
FIG. 1 shows a schematic of an example redox flow battery system including a battery cell with electrodes and a membrane separator.

As shown in FIG. 1, in a redox flow battery system 10, a negative electrode 26 may be referred to as a plating electrode and a positive electrode 28 may be referred to as a redox electrode. A negative electrolyte within a plating side (e.g., a negative electrode compartment 20) of a redox flow battery cell 18 may be referred to as a plating electrolyte, and a positive electrolyte on a redox side (e.g., a positive electrode compartment 22) of the redox flow battery cell 18 may be referred to as a redox electrolyte.

"Anode" refers to an electrode where electroactive material loses electrons and "cathode" refers to an electrode where electroactive material gains electrons. During battery charge, the positive electrolyte gains electrons at the negative electrode 26, and the negative electrode 26 is the cathode of the electrochemical reaction. During discharge, the positive electrolyte loses electrons, and the negative electrode 26 is the anode of the electrochemical reaction. Alternatively, during discharge, the negative electrolyte and the negative electrode 26 may be respectively referred to as an anolyte and the anode of the electrochemical reaction, while the positive electrolyte and the positive electrode 28 may be respectively referred to as a catholyte and the cathode of the electrochemical reaction. During charge, the negative electrolyte and the negative electrode 26 may be respectively referred to as the catholyte and the cathode of the electrochemical reaction, while the positive electrolyte and the positive electrode 28 may be respectively referred to as the anolyte and the anode of the electrochemical reaction. For simplicity, the terms "positive" and "negative" are used herein to refer to the electrodes, electrolytes, and electrode compartments in redox battery flow systems.

One example of a hybrid redox flow battery is an all-iron redox flow battery (IFB), in which the electrolyte includes iron ions in the form of iron salts (e.g., $FeCl_2$, $FeCl_3$, and the like), wherein the negative electrode 26 includes metal iron. For example, at the negative electrode 26, ferrous iron ($Fe^{2+}$) gains two electrons and plates as iron metal ($Fe^0$) onto the negative electrode 26 during battery charge, and $Fe^0$ loses two electrons and re-dissolves as $Fe^{2+}$ during battery discharge. At the positive electrode 28, $Fe^{2+}$ loses an electron to form ferric iron ($Fe^{3+}$) during charge, and during discharge $Fe^{3+}$ gains an electron to form $Fe^{2+}$. The electrochemical reaction is summarized in equations (5) and (6), wherein the forward reactions (left to right) indicate electrochemical reactions during battery charge, while the reverse reactions (right to left) indicate electrochemical reactions during battery discharge:

$$Fe^{2+}+2e^- \leftrightarrow Fe^0 -0.44 \text{ V (negative electrode)} \quad (5)$$

$$Fe^{2+} \leftrightarrow 2Fe^{3+}+2e \;+0.77 \text{ V (positive electrode)} \quad (6)$$

As discussed above, the negative electrolyte used in the IFB may provide a sufficient amount of $Fe^{2+}$ so that, during charge, $Fe^{2+}$ may accept two electrons from the negative electrode 26 to form $Fe^0$ and plate onto a substrate thereof. During discharge, the plated $Fe^0$ may then lose two electrons, ionizing into $Fe^{2+}$ and may be dissolved back into the electrolyte. An equilibrium potential of the above reaction is −0.44 V and this reaction therefore provides a negative terminal for the desired system. On the positive side of the IFB, the electrolyte may provide $Fe^{2+}$ during charge which loses an electron and oxidizes to $Fe^{3+}$. During discharge, $Fe^{3+}$ provided by the electrolyte becomes $Fe^{2+}$ by absorbing an electron provided by the positive electrode 28. An equilibrium potential of this reaction is +0.77 V, creating a positive terminal for the desired system.

The IFB may provide the ability to charge and recharge electrolytes therein in contrast to other battery types utilizing non-regenerating electrolytes. Charge may be achieved by respectively applying a current across electrodes 26 and 28 via terminals 40 and 42. The negative electrode 26 may be coupled via terminal 40 to a negative side of a voltage source so that electrons may be delivered to the negative electrolyte via the positive electrode 28 (e.g., as $Fe^{2+}$ is oxidized to $Fe^{3+}$ in the positive electrolyte in the positive electrode compartment 22). The electrons provided to the negative electrode 26 may reduce the $Fe^{2+}$ in the negative electrolyte to form $Fe^0$ at the substrate, causing the $Fe^{2+}$ to plate onto the negative electrode 26.

Discharge may be sustained while $Fe^0$ remains available to the negative electrolyte for oxidation and while $Fe^{3+}$ remains available in the positive electrolyte for reduction. As an example, $Fe^{3+}$ availability may be maintained by increasing a concentration or a volume of the positive electrolyte in the positive electrode compartment 22 side of the redox flow battery cell 18 to provide additional $Fe^{3+}$ ions via an external source, such as an external positive electrolyte chamber 52. More commonly, availability of $Fe^0$ during discharge may be an issue in IFB systems, wherein the $Fe^0$ available for discharge may be proportional to a surface area and a volume of the negative electrode substrate, as well as to a plating efficiency. Charge capacity may be dependent on the availability of $Fe^{2+}$ in the negative electrode compartment 20. As an example, $Fe^{2+}$ availability may be maintained by providing additional $Fe^{2+}$ ions via an external source, such as an external negative electrolyte chamber 50 to increase a concentration or a volume of the negative electrolyte to the negative electrode compartment 20 side of the redox flow battery cell 18.

In an IFB, the positive electrolyte may include ferrous iron, ferric iron, ferric complexes, or any combination thereof, while the negative electrolyte includes ferrous iron or ferrous complexes, depending on a state of charge (SOC) of the IFB system. As previously mentioned, utilization of iron ions in both the negative electrolyte and the positive electrolyte allows for utilization of the same electrolytic species on both sides of the redox flow battery cell 18, which may reduce electrolyte cross-contamination and may increase the efficiency of the IFB system, resulting in less electrolyte replacement as compared to other redox flow battery systems.

Efficiency losses in an IFB may result from electrolyte crossover through a separator 24 (e.g., ion-exchange membrane barrier, microporous membrane, and the like). For example, $Fe^{3+}$ ions in the positive electrolyte may be driven toward the negative electrolyte by a $Fe^{3+}$ ion concentration gradient and an electrophoretic force across the separator 24. Subsequently, $Fe^{3+}$ ions penetrating the separator 24 and crossing over to the negative electrode compartment 20 may result in coulombic efficiency losses. $Fe^{3+}$ ions crossing over from the low pH redox side (e.g., more acidic positive electrode compartment 22) to high pH plating side (e.g., less acidic negative electrode compartment 20) may result in precipitation of $Fe(OH)_3$. Precipitation of $Fe(OH)_3$ may degrade the separator 24 and cause permanent battery performance and efficiency losses. For example, $Fe(OH)_3$ precipitate may chemically foul an organic functional group of an ion-exchange membrane or physically clog micro-pores of the ion-exchange membrane. In either case, due to the $Fe(OH)_3$ precipitate, membrane ohmic resistance may rise over time and battery performance may degrade. Precipitate may be removed by washing the IFB with acid, but constant maintenance and downtime may be disadvantageous for commercial battery applications. Furthermore, washing may be dependent on regular preparation of electrolyte, contributing to additional processing costs and complexity. Alternatively, adding specific organic acids to the positive electrolyte and the negative electrolyte in response to electrolyte pH changes may mitigate precipitate formation during battery charge and discharge cycling without driving up overall costs. Additionally, implementing a membrane barrier that inhibits $Fe^{3+}$ ion crossover may also mitigate fouling.

Additional coulombic efficiency losses may be caused by reduction of $H^+$ (e.g., protons) and subsequent formation of $H_2$ (e.g., hydrogen gas), and a reaction of protons in the negative electrode compartment 20 with electrons supplied at the plated iron metal of the negative electrode 26 to form hydrogen gas.

The IFB electrolyte (e.g., $FeCl_2$, $FeCl_3$, $FeSO_4$, $Fe_2(SO_4)_3$, and the like) may be readily available and may be produced at low costs. The IFB electrolyte offers higher reclamation value because the same electrolyte may be used for the negative electrolyte and the positive electrolyte, consequently reducing cross-contamination issues as compared to other systems. Furthermore, because of iron's electron configuration, iron may solidify into a generally uniform solid structure during plating thereof on the negative electrode substrate. For zinc and other metals commonly used in hybrid redox batteries, solid dendritic structures may form during plating. A stable electrode morphology of the IFB system may increase the efficiency of the battery in comparison to other redox flow batteries. Further still, iron redox flow batteries reduce the use of toxic raw materials and may operate at a relatively neutral pH as compared to other redox flow battery electrolytes. Accordingly, IFB systems may reduce environmental hazards as compared with all other current advanced redox flow battery systems in production.

Continuing with FIG. 1, a schematic illustration of the redox flow battery system 10 is shown. The redox flow battery system 10 may include the redox flow battery cell 18 fluidly coupled to an integrated multi-chambered electrolyte storage tank 110. The redox flow battery cell 18 may generally include the negative electrode compartment 20, separator 24, and positive electrode compartment 22. The separator 24 may include an electrically insulating ionic conducting barrier which prevents bulk mixing of the positive electrolyte and the negative electrolyte while allowing conductance of specific ions therethrough. For example, the separator 24 may include an ion-exchange membrane and/or a microporous membrane.

The negative electrode compartment 20 may include the negative electrode 26, and the negative electrolyte including electroactive materials. The positive electrode compartment 22 may include the positive electrode 28, and the positive electrolyte including electroactive materials. In some examples, multiple redox flow battery cells 18 may be combined in series or in parallel to generate a higher voltage or current in a redox flow battery system.

Further illustrated in FIG. 1 are negative and positive electrolyte pumps 30 and 32, both used to pump electrolyte solution through the redox flow battery system 10. Electrolytes are stored in one or more tanks external to the cell, and are pumped via the negative and positive electrolyte pumps 30 and 32 through the negative electrode compartment 20 side and the positive electrode compartment 22 side of the redox flow battery cell 18, respectively.

The redox flow battery system 10 may also include a first bipolar plate 36 and a second bipolar plate 38, each positioned along a rear-facing side, e.g., opposite of a side facing the separator 24, of the negative electrode 26 and the positive electrode 28, respectively. The first bipolar plate 36 may be in contact with the negative electrode 26 and the second bipolar plate 38 may be in contact with the positive electrode 28. In other examples, however, the bipolar plates 36 and 38 may be arranged proximate but spaced away from the electrodes 26 and 28 within the respective electrode compartments 20 and 22. The IFB electrolytes may be transported to reaction sites at the negative and positive electrodes 26 and 28 by the first and second bipolar plates 36 and 38, resulting from conductive properties of a material of the bipolar plates 36 and 38. Electrolyte flow may also be assisted by the negative and positive electrolyte pumps 30 and 32, facilitating forced convection through the redox flow battery cell 18. Reacted electrochemical species may also be directed away from the reaction sites by a combination of forced convection and a presence of the first and second bipolar plates 36 and 38.

As illustrated in FIG. 1, the redox flow battery cell 18 may further include the negative battery terminal 40 and the positive battery terminal 42. When a charge current is applied to the battery terminals 40 and 42, the positive electrolyte may be oxidized (loses one or more electrons) at the positive electrode 28, and the negative electrolyte may be reduced (gains one or more electrons) at the negative electrode 26. During battery discharge, reverse redox reactions may occur on the electrodes 26 and 28. In other words, the positive electrolyte may be reduced (gains one or more electrons) at the positive electrode 28, and the negative electrolyte may be oxidized (loses one or more electrons) at the negative electrode 26. An electrical potential difference across the battery may be maintained by the electrochemical redox reactions in the positive electrode compartment 22 and the negative electrode compartment 20, and may induce a current through a current collector while the reactions are sustained. An amount of energy stored by a redox battery is limited by an amount of electroactive material available in electrolytes for discharge, depending on a total volume of electrolytes and a solubility of the electroactive materials.

The flow battery system 10 may further include the integrated multi-chambered electrolyte storage tank 110. The multi-chambered electrolyte storage tank 110 may be divided by a bulkhead 98. The bulkhead 98 may create multiple chambers within the multi-chambered electrolyte storage tank 110 so that both the positive and negative electrolytes may be included within a single tank. The negative electrolyte chamber 50 holds negative electrolyte including the electroactive materials, and the positive electrolyte chamber 52 holds positive electrolyte including the electroactive materials. The bulkhead 98 may be positioned within the multi-chambered electrolyte storage tank 110 to yield a desired volume ratio between the negative electrolyte chamber 50 and the positive electrolyte chamber 52. In one example, the bulkhead 98 may be positioned to set a volume ratio of the negative and positive electrolyte chambers 50 and 52 according to a stoichiometric ratio between the negative and positive redox reactions. FIG. 1 further illustrates a fill height 112 of the multi-chambered electrolyte storage tank 110, which may indicate a liquid level in each tank compartment. FIG. 1 also shows a gas head space 90 located above the fill height 112 of the negative electrolyte chamber 50, and a gas head space 92 located above the fill height 112 of the positive electrolyte chamber 52. The gas head space 92 may be utilized to store hydrogen gas generated through operation of the redox flow battery (e.g., due to proton reduction and iron corrosion side reactions) and conveyed to the multi-chambered electrolyte storage tank 110 with returning electrolyte from the redox flow battery cell 18. The hydrogen gas may be separated spontaneously at a gas-liquid interface (e.g., the fill height 112) within the multi-chambered electrolyte storage tank 110, thereby precluding having additional gas-liquid separators as part of the redox flow battery system 10. Once separated from the electrolyte, the hydrogen gas may fill the gas head spaces 90 and 92. As such, the stored hydrogen gas may aid in purging other gases from the multi-chambered electrolyte storage tank 110, thereby acting as an inert gas blanket for reducing oxidation of electrolyte species, which may help to reduce redox flow battery capacity losses. In this way, utilizing the integrated multi-chambered electrolyte storage tank 110 may forego having separate negative and positive electrolyte storage tanks, hydrogen storage tanks, and gas-liquid separators common to conventional redox flow battery systems, thereby simplifying a system design, reducing a physical footprint of the redox flow battery system 10, and reducing system costs.

FIG. 1 also shows a spill over hole 96, which may create an opening in the bulkhead 98 between the gas head spaces 90 and 92, and may provide a means of equalizing gas pressure between the chambers 50 and 52. The spill over hole 96 may be positioned at a threshold height above the fill height 112. The spill over hole 96 may further enable a capability to self-balance the electrolytes in each of the negative and positive electrolyte chambers 50 and 52 in the event of a battery crossover. In the case of an all-iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but overall electrolyte composition, battery module performance, and battery module capacity may be maintained. Flange fittings may be utilized for all piping connections for inlets and outlets to and from the multi-chambered electrolyte storage tank 110 to maintain a continuously pressurized state without leaks. The multi-chambered electrolyte storage tank 110 may include at least one outlet from each of the negative and positive electrolyte chambers 50 and 52, and at least one inlet to each of the negative and positive electrolyte chambers 50 and 52. Furthermore, one or more outlet connections may be provided from the gas head spaces 90 and 92 for directing hydrogen gas to rebalancing reactors 80 and 82.

Although not shown in FIG. 1, the integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers 50 and 52 may include one or more heaters. In the case where only the positive electrolyte chamber 52 includes one or more heaters, the negative electrolyte may be heated by transferring heat generated at the redox flow battery cell 18 to the negative electrolyte. In this way, the redox flow battery cell 18 may heat and facilitate temperature regulation of the negative electrolyte. The one or more heaters may be actuated by a controller 88 to regulate a temperature of the negative electrolyte chamber 50 and the positive electrolyte chamber 52 independently or together. For example, in response to an electrolyte temperature decreasing below a threshold temperature, the controller 88 may increase a power supplied to one or more heaters so that a heat flux to the electrolyte may be increased. The electrolyte temperature may be indicated by one or more temperature sensors mounted at the multi-chambered electrolyte storage tank 110, such as sensors 60 and 62. As examples, the one or more heaters may include coil type heaters or other immersion heaters immersed in the electrolyte fluid, or surface mantle type heaters that transfer heat conductively through the walls of the negative and positive electrolyte chambers 50 and 52 to heat the fluid therein. Other known types of tank heaters may be employed without departing from the scope of the present disclosure. Furthermore, the controller 88 may deactivate the one or more heaters in the negative and positive electrolyte chambers 50 and 52 in response to a liquid level decreasing below a solids fill threshold level. Said in another way, in some examples, the controller 88 may activate the one or more heaters in the negative and positive electrolyte chambers 50 and 52 only in response to a liquid level increasing above the solids fill threshold level. In this way, activating the one or more heaters without sufficient liquid in the negative and/or positive electrolyte chambers 50, 52 may be averted, thereby reducing a risk of overheating or burning out the heater(s).

Further still, one or more inlet connections may be provided to each of the negative and positive electrolyte chambers 50 and 52 from a field hydration system (not shown). In this way, the field hydration system may facilitate commissioning of the redox flow battery system 10, including installing, filling, and hydrating the system, at an end-use location. Furthermore, prior to commissioning the redox flow battery system 10 at the end-use location, the system 10 may be dry-assembled at a battery manufacturing facility different from the end-use location without filling and hydrating the system 10, before delivering the system 10 to the end-use location. In one example, the end-use location may correspond to the location where the redox flow battery system 10 is to be installed and utilized for on-site energy storage. Said another way, it will be appreciated that, once installed and hydrated at the end-use location, a position of the redox flow battery system 10 may become fixed, and the redox flow battery system 10 may no longer be deemed a portable, dry system. Thus, from a perspective of an end-user, the dry, portable redox flow battery system 10 may be delivered on-site, after which the redox flow battery system 10 may be installed, hydrated, and commissioned. Prior to hydration, the redox flow battery system 10 may be referred to as a dry, portable system, the redox flow battery system 10 being free of or without water and wet electrolyte. Once hydrated, the redox flow battery system 10 may be referred to as a wet, non-portable system, the redox flow battery system 10 including wet electrolyte.

Further illustrated in FIG. 1, electrolyte solutions typically stored in the multi-chambered electrolyte storage tank 110 are pumped via the negative and positive electrolyte pumps 30 and 32 throughout the redox flow battery system 10. Electrolyte stored in the negative electrolyte chamber 50 is pumped via the negative electrolyte pump 30 through the negative electrode compartment 20 side of the redox flow battery cell 18, and electrolyte stored in the positive electrolyte chamber 52 is pumped via the positive electrolyte pump 32 through the positive electrode compartment 22 side of the redox flow battery cell 18.

The electrolyte rebalancing reactors 80 and 82 may be connected in line or in parallel with the recirculating flow paths of the electrolyte at the negative and positive sides of the redox flow battery cell 18, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in a return flow path from the negative and positive electrode compartments 20 and 22 to the negative and positive electrolyte chambers 50 and 52, respectively. The electrolyte rebalancing reactors 80 and 82 may serve to rebalance electrolyte charge imbalances in the redox flow battery system 10 occurring due to side reactions, ion crossover, and the like, as described herein. In one example, electrolyte rebalancing reactors 80 and 82 may include trickle bed reactors, where the hydrogen gas and electrolyte may be contacted at catalyst surfaces in a packed bed for carrying out the electrolyte rebalancing reaction. In other examples the rebalancing reactors 80 and 82 may include flow-through type reactors that are capable of contacting the hydrogen gas and the electrolyte liquid and carrying out the electrolyte rebalancing reactions absent a packed catalyst bed.

During operation of the redox flow battery system 10, sensors and probes may monitor and control chemical properties of the electrolyte such as electrolyte pH, concentration, SOC, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. In another example, sensors 62 and 60 may each include one or more electrolyte level sensors to indicate a level of electrolyte in the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. The sensors 72 and 70 may be pH probes, optical probes, pressure sensors, voltage sensors, etc. It will be appreciated that sensors may be positioned at other locations throughout the redox flow battery system 10 to monitor electrolyte chemical properties and other properties.

For example, a sensor may be positioned in an external acid tank (not shown) to monitor acid volume or pH of the external acid tank, wherein acid from the external acid tank may be supplied via an external pump (not shown) to the redox flow battery system 10 in order to reduce precipitate formation in the electrolytes. Additional external tanks and sensors may be installed for supplying other additives to the redox flow battery system 10. For example, various sensors including, temperature, conductivity, and level sensors of a field hydration system may transmit signals to the controller 88. Furthermore, the controller 88 may send signals to actuators such as valves and pumps of the field hydration system during hydration of the redox flow battery system 10. Sensor information may be transmitted to the controller 88 which may in turn actuate the pumps 30 and 32 to control electrolyte flow through the redox flow battery cell 18, or to perform other control functions, as an example. In this manner, the controller 88 may be responsive to one or a combination of sensors and probes.

The redox flow battery system 10 may further include a source of hydrogen gas. In one example, the source of hydrogen gas may include a separate dedicated hydrogen gas storage tank. In the example of FIG. 1, hydrogen gas may be stored in and supplied from the integrated multi-chambered electrolyte storage tank 110. The integrated multi-chambered electrolyte storage tank 110 may supply additional hydrogen gas to the positive electrolyte chamber 52 and the negative electrolyte chamber 50. The integrated multi-chambered electrolyte storage tank 110 may alternately supply additional hydrogen gas to an inlet of the electrolyte rebalancing reactors 80 and 82. As an example, a mass flow meter or other flow controlling device (which may be controlled by the controller 88) may regulate flow of the hydrogen gas from the integrated multi-chambered electrolyte storage tank 110. The integrated multi-chambered electrolyte storage tank 110 may supplement the hydrogen gas generated in the redox flow battery system 10. For example, when gas leaks are detected in the redox flow battery system 10 or when a reduction reaction rate is too low at low hydrogen partial pressure, hydrogen gas may be supplied from the integrated multi-chambered electrolyte storage tank 110 in order to rebalance the SOC of the electroactive materials in the positive electrolyte and negative electrolyte. As an example, and as discussed below with reference to FIG. 3, the controller 88 may supply hydrogen gas from the integrated multi-chambered electrolyte storage tank 110 in response to a measured change in pH or in response to a measured change in SOC of an electrolyte or an electroactive material.

For example, an increase in pH of the negative electrolyte chamber 50, or the negative electrode compartment 20, may indicate that hydrogen is leaking from the redox flow battery system 10 and/or that the reaction rate is too slow with the available hydrogen partial pressure, and the controller 88, in response to the pH increase, may increase a supply of hydrogen gas from the integrated multi-chambered electrolyte storage tank 110 to the redox flow battery system 10. As a further example, the controller 88 may supply hydrogen gas from the integrated multi-chambered electrolyte storage tank 110 in response to a pH change, wherein the pH increases beyond a first threshold pH or decreases beyond a second threshold pH. In the case of an IFB, the controller 88 may supply additional hydrogen to increase a rate of reduction of $Fe^{3+}$ ions and a rate of production of protons, thereby reducing the pH of the positive electrolyte. Furthermore, the pH of the negative electrolyte may be lowered by hydrogen reduction of $Fe^{3+}$ ions crossing over from the positive electrolyte to the negative electrolyte or by protons, generated at the positive side, crossing over to the negative electrolyte due to a proton concentration gradient and electrophoretic forces. In this manner, the pH of the negative electrolyte may be maintained within a stable region, while reducing the risk of precipitation of $Fe^{3+}$ ions (crossing over from the positive electrode compartment 22) as $Fe(OH)_3$.

Other control schemes for controlling a supply rate of hydrogen gas from the integrated multi-chambered electrolyte storage tank 110 responsive to a change in an electrolyte pH or to a change in an electrolyte SOC, detected by other sensors such as an oxygen-reduction potential (ORP) meter or an optical sensor, may be implemented. Further still, the change in pH or SOC triggering action of the controller 88 may be based on a rate of change or a change measured over a time period. The time period for the rate of change may be predetermined or adjusted based on time constants for the redox flow battery system 10. For example, the time period may be reduced if a recirculation rate is high, and local changes in concentration (e.g., due to side reactions or gas leaks) may quickly be measured since the time constants may be small.

The controller 88 may further execute control schemes based on an operating mode of the redox flow battery system 10. For example, and as discussed below with reference to FIG. 2, the controller 88 may control charging and discharging of the redox flow battery cell 18 so as to cause iron preformation at the negative electrode 26 during system conditioning (where system conditioning may include an operating mode employed to optimize electrochemical performance of the redox flow battery system 10 outside of battery cycling). That is, during system conditioning, the controller 88 may adjust one or more operating conditions of the redox flow battery system 10 to plate iron metal on the negative electrode 26 to improve a battery charge capacity during subsequent battery cycling (thus, the iron metal may be preformed for battery cycling). The controller 88 may further execute electrolyte rebalancing as discussed above to rid the redox flow battery system 10 of excess hydrogen gas and reduce $Fe^{3+}$ ion concentration. In this way, preforming iron at the negative electrode 26 and running electrolyte rebalancing during the system conditioning may increase an overall capacity of the redox flow battery cell 18 during battery cycling by mitigating iron plating loss. As used herein, battery cycling may include alternating between a charging mode and a discharging mode of the redox flow battery system 10.

It will be appreciated that all components apart from the sensors 60 and 62 and the integrated multi-chambered electrolyte storage tank 110 (and components included therein) may be considered as being included in a power module 120. As such, the redox flow battery system 10 may be described as including the power module 120 fluidly coupled to the integrated multi-chambered electrolyte storage tank 110 and communicatively coupled to the sensors 60 and 62. In some examples, each of the power module 120 and the multi-chambered electrolyte storage tank 110 may be included in a single housing (not shown), such that the redox flow battery system 10 may be contained as a single unit in a single location. It will further be appreciated the positive electrolyte, the negative electrolyte, the sensors 60 and 62, the electrolyte rebalancing reactors 80 and 82, and the integrated multi-chambered electrolyte storage tank 110 (and components included therein) may be considered as being included in an electrolyte subsystem 130. As such, the electrolyte subsystem 130 may supply one or more electrolytes to the redox flow battery cell 18 (and components included therein).

Referring now to FIG. 2, a flow chart of a method 200 for iron preformation at a negative electrode of a redox flow battery system is depicted. Method 200 will be described with reference to the embodiment provided hereinabove, though it may be understood that similar methods may be applied to other systems without departing from the scope of this disclosure. For example, method 200 may be executed by the redox flow battery system 10 of FIG. 1. Specifically, method 200 may be carried out via the controller 88, and may be stored as executable instructions at a non-transitory storage medium (e.g., memory). Further components described with reference to FIG. 2 may be examples of corresponding components of the redox flow battery system 10 of FIG. 1.

At 202, method 200 may include determining or measuring or estimating one or more operating conditions of the redox flow battery system (e.g., 10). As examples, measuring the one or more operating conditions may include measuring electrolyte chemical properties including pH, battery SOC, electrolyte concentrations (e.g., concentration of $Fe^{3+}$, $Fe^{2+}$, etc.), electrolyte SOC, and the like using various sensors and/or probes (e.g., sensors 60, 62, 70, 72). As further examples, the one or more operating conditions may include power module voltage, DC current, pump activity (e.g., electrolyte pump ON/OFF statuses, electrolyte pump flow rates, pump timers, and the like), electrolyte temperatures, power (including current and voltage) supplied to the power module, internal power demand set points, external power demand set points, battery charge capacity, and the like, each of which may be indicated (e.g., determined, measured, estimated) by feedback from one or more sensors of the redox flow battery system.

At 204, method 200 may include determining whether system conditioning entry conditions are met based on the one or more determined/measured/estimated operating conditions of the redox flow battery system (e.g., 10). For example, the controller (e.g., 88) may determine that system conditioning entry conditions are met when the redox flow battery system reaches a threshold degradation level. In one example, the threshold degradation level may be reached when the battery charge capacity is reduced beyond a threshold battery charge capacity. In some examples, battery charge capacity may be reduced as a result of iron plating loss at the negative electrode (e.g., 26) of the redox flow battery cell (e.g., 18).

If the system conditioning entry conditions are not met, for example if the battery charge capacity is higher than the threshold battery charge capacity, method 200 may proceed to 206 to determine whether the battery SOC (e.g., determined/measured/estimated at 202) is less than a threshold battery SOC. If the battery SOC is greater or equal to the threshold battery SOC, method 200 may proceed to 208 to enter battery cycling with the discharging mode. As such, the redox flow battery system (e.g., 10) may enter the discharging mode. In some examples, the redox flow battery system (e.g., 10) may be in an idle mode, and battery cycling of the redox flow battery system may be initiated by transitioning to the discharging mode. In other examples, the redox flow battery system may already be in battery cycling (e.g., in the charging mode) and battery cycling may include entering the discharging mode to continue battery cycling in response to the system conditioning entry conditions not being met.

Discharging the redox flow battery system may include operating an electrolyte pump (e.g., one or more of the negative and positive electrolyte pumps 30 and 32) to flow electrolytes to the negative and positive electrode compartments (e.g., 20 and 22) at discharging threshold negative and positive electrolyte pump flow rates, respectively. In another example, the controller (e.g., 88) may supply power to the power module (e.g., 120), for example, by supplying a DC current to the negative electrode (e.g., 26), greater than a discharging threshold supply of power. Furthermore, the controller may operate one or more actuators in order to maintain one or more of electrolyte species concentrations, pH, ionic strength, and other electrolyte characteristics corresponding to the redox flow battery system being in the discharging mode. In some examples, battery cycling may then continue by exiting the discharging mode and entering the charging mode (and without entering the idle mode). Method 200 may then end.

Returning to 206, if the battery SOC is less than the threshold battery SOC, method 200 may proceed to 210 to enter battery cycling with the charging mode. As such, the redox flow battery system (e.g., 10) may enter the charging mode. In some examples, the redox flow battery system (e.g., 10) may be in an idle mode, and battery cycling of the redox flow battery system may be initiated by transitioning to the charging mode. In other examples, the redox flow battery system may already be in battery cycling (e.g., in the discharging mode) and battery cycling may include entering the charging mode to continue battery cycling in response to the system conditioning entry conditions not being met.

Charging the redox flow battery system may include operating an electrolyte pump (e.g., one or more of the negative and positive electrolyte pumps 30 and 32) to flow electrolytes to the negative and positive electrode compartments (e.g., 20 and 22) at charging threshold negative and positive electrolyte pump flow rates, respectively. In another example, the controller (e.g., 88) may supply power to the power module (e.g., 120), for example, by supplying a DC current to the positive electrode (e.g., 28), greater than a charging threshold supply of power. Furthermore, the controller may operate one or more actuators in order to maintain one or more of electrolyte species concentrations, pH, ionic strength, and other electrolyte characteristics corresponding to the redox flow battery system being in the charging mode. In some examples, battery cycling may then continue by exiting the charging mode and entering the discharging mode (and without entering the idle mode). Method 200 may then end.

Returning to 204, if the system conditioning entry conditions are met, for example, if the battery charge capacity is lower than the threshold battery charge capacity, method 200 may proceed to 212 to enter system conditioning. In general, battery system conditioning may be employed to optimize electrochemical performance (e.g., improving the battery charge capacity) during useful life of a battery cell. For example, system conditioning may be initiated in the redox flow battery system (e.g., 10) by the controller (e.g., 88) in response to a suboptimal operating condition (e.g., low battery charge capacity) being identified. System conditioning may include the controller altering one or more operating conditions of the redox flow battery system to optimize the suboptimal operating condition.

At 214, method 200 may include entering the charging mode for iron preformation. The charging mode may include charging the redox flow battery system (e.g., 10) at a set point or to a desired battery SOC. As described above, charging the redox flow battery system may include operating an electrolyte pump (e.g., one or more of the negative and positive electrolyte pumps 30 and 32 of FIG. 1) to flow electrolytes to the negative and positive electrode compartments (e.g., 20 and 22) at charging threshold negative and positive electrolyte pump flow rates, respectively. In another example, the controller (e.g., 88) may supply power to the power module (e.g., 120), for example, by supplying a DC current to the positive electrode (e.g., 28), greater than a charging threshold supply of power in order to raise an actual battery SOC of the redox flow battery cell (e.g., 18) to the desired battery SOC. In some examples, raising the actual battery SOC of the redox flow battery cell to the desired battery SOC may include increasing the SOC by a rate of SOC increase greater than a charging threshold rate of SOC increase. In some examples, an indication that the actual battery SOC has increased to the desired battery SOC may be confirmed via feedback received at the controller from an ORP probe. Furthermore, the controller may operate one or more actuators in order to maintain one or more of electrolyte species concentrations, pH, ionic strength, and other electrolyte characteristics at a desired value that may correspond to the redox flow battery system being in the charging mode. In one example, the desired values may include being beyond a threshold value characteristic to operation of the redox flow battery system in the charging mode. In this way, the redox flow battery system may enter the charging mode during system conditioning (e.g., for iron preformation) even though the battery charge capacity is below the threshold battery charge capacity typically utilized to enter the charging mode (e.g., for battery cycling).

In general, and as discussed above with reference to FIG. 1, during the charging mode, at the positive electrode (e.g., 28), $Fe^{2+}$ may lose an electron to form $Fe^{3+}$. As such, during the charging mode, a concentration of $Fe^{3+}$ in the electrolyte may increase by a first $Fe^{3+}$ amount. Further, at the negative electrode (e.g., 26), $Fe^{2+}$ may gain two electrons and plate as $Fe^0$ onto the negative electrode. However, due to side reactions at the negative electrode (e.g., proton reduction, iron corrosion), significant hydrogen gas may be generated in the electrode compartments (e.g., 20, 22) of the redox flow battery cell (e.g., 18). As a result, a partial pressure of the hydrogen gas (e.g., hydrogen gas concentration) is high, increasing a tank pressure of the integrated multi-chambered electrolyte storage tank (e.g., 110) fluidly coupled to the redox flow battery cell.

As such, at 216, method 200 may include determining whether the tank pressure is greater than a first threshold pressure. The first threshold pressure may be selected to be below a tank pressure at which one or more components of the redox flow battery system (e.g., 10) rupture or become degraded. If the tank pressure is less than or equal to the first threshold pressure, method 200 may proceed to 218 to continue charging the redox flow battery cell (e.g., 18), that is, to maintain the charging mode.

If the tank pressure is greater than the first threshold pressure, method 200 may proceed to 220 to exit the charging mode and enter the idle mode. In general, the idle mode of the redox flow battery system (e.g., 10) may include maintaining one or more operating conditions (e.g., electrolyte temperatures, electrolyte pump flow rates, etc.) while not actively undergoing charge/discharge cycling, such that a readiness of the redox flow battery system to supply power in response to a charge or discharge command from the controller (e.g., 88) may be maintained. In one example, exiting the charging mode and entering the idle mode may include draining a DC current from the power module (e.g., 120) to less than or substantially equal to an idle threshold current by disconnecting power to the redox flow battery system. In one example, the idle threshold current may be zero.

At 222, method 200 may include initiating electrolyte rebalancing. As discussed with reference to FIG. 3, electrolyte rebalancing in the redox flow battery system (e.g., 10) may include employing a catalytic electrolyte rebalancing subsystem to lower imbalanced $Fe^{3+}$ by supplying hydrogen gas as a reductant to reduce excess $Fe^{3+}$ to $Fe^{2+}$. As such, electrolyte rebalancing may decrease the concentration of $Fe^{3+}$ in the electrolyte by a second $Fe^{3+}$ amount. In some examples, the second $Fe^{3+}$ amount may be greater than the first $Fe^{3+}$ amount. In this way, $Fe^{3+}$ may be removed from the redox flow battery system, shifting equilibria of one or more side reactions and mitigating oxidation of plated iron by the $Fe^{3+}$.

At 224, method 200 may include determining whether the tank pressure is less than a second threshold pressure. The second threshold pressure may be selected to indicate that a threshold amount of the hydrogen gas has reacted. In some examples, the second threshold pressure may be less than the first threshold pressure. If the tank pressure is greater than or equal to the second threshold pressure, method 200 may proceed to 226 to continue electrolyte rebalancing.

If the tank pressure is less than the second threshold pressure, method 200 may proceed to 228 to determine whether a desired iron preformation (e.g., a desired iron plating amount) has been achieved. Further, the controller (e.g., 88) may command electrolyte rebalancing to finish upon the tank pressure being determined to be less than the second threshold pressure. In some examples, the desired iron preformation may be achieved when the iron plating amount is less than a threshold amount, where the threshold amount may be selected to increase the battery charge capacity above the threshold battery charge capacity. In additional or alternative examples, the threshold amount may be predetermined based on a previous cycling efficiency or a desired cycling efficiency of the redox flow battery system (e.g., 10). In additional or alternative examples, the iron plating amount may be inferred based on the concentration of $Fe^{3+}$ in the electrolyte. For example, the desired iron preformation may include an indication of the concentration of $Fe^{3+}$ in the electrolyte lower than a threshold concentration, where the threshold concentration may be selected to be a point to which the concentration of $Fe^{3+}$ has been lowered such that iron plating oxidation may be mitigated in subsequent battery cycling. If the desired iron preformation has not been achieved, method 200 may return to 214 to exit the idle mode and reenter the charging mode. As such, charging may be continued in the redox flow battery system and thereby continue iron preformation. In this way, the method of iron preformation provided by the present disclosure may include the controller (e.g., 88) actively cycling the charging mode and the idle mode to preform iron at the negative electrode (e.g., 26) until the desired iron preformation is achieved. In some examples, the method of iron preformation including active cycling of the charging mode and the idle mode may be performed during a manufacturing process, such that a final redox flow battery system may be prepared for long-term commercial use.

If the desired iron preformation amount has been achieved, method 200 may proceed to 230 to exit system conditioning, and then to 210 to enter battery cycling with the charging mode, with the battery charge capacity greater than the threshold battery charge capacity. Method 200 may then end.

In this way, a redox flow battery system may utilize system conditioning to preform iron at a negative electrode therein, and may then initiate electrolyte rebalancing to reduce an electrolyte concentration of $Fe^{3+}$, thereby mitigating iron plating loss upon subsequent battery cycling.

In general, as a result of hydrogen gas generation via side reactions (e.g., proton reduction, iron corrosion), the negative electrolyte in the negative electrode compartment tends to stabilize at a pH range between 3 and 6. At the positive electrode compartment, $Fe^{3+}$ has a much lower acid dissociation constant ($pK_a$) than that of $Fe^{2+}$. Thus, as more $Fe^{2+}$ is oxidized to $Fe^{3+}$, the positive electrolyte tends in the positive electrode compartment tends to stabilize at a pH less than 2, and in some examples, at a pH near 1.

Accordingly, maintaining the negative electrolyte pH in a first pH range in which the negative electrolyte (e.g., in the negative electrode compartment) remains stable and maintaining the positive electrolyte pH in a second pH range in which the positive electrolyte (e.g., in the positive electrode compartment) remains stable may reduce low cycling performance and increase efficiency of the redox flow battery system as a whole. For example, maintaining the negative electrolyte pH between 3 and 4 may reduce iron corrosion and increase iron plating efficiency, while maintaining the positive electrolyte pH less than 2, and in some examples, near 1, may promote the redox reaction and reduce $Fe(OH)_3$ formation.

Further, hydrogen gas generation may cause electrolyte imbalance in the redox flow battery system. For example, during charging, electrons flowing from the positive electrode to the negative electrode, for example, as a result of $Fe^{2+}$ oxidation, may be consumed by generated hydrogen gas, thereby reducing electrons available for plating. As a result of reduced plating, the battery charge capacity is correspondingly reduced. Additionally, corrosion of $Fe^0$ further reduces the battery charge capacity, as a decreased amount of $Fe^0$ is available for battery discharge. Thus, an electrolyte SOC imbalance between the negative electrode compartment and the positive electrode compartment may develop as a result of the hydrogen gas generation. Furthermore, and as discussed above, the hydrogen gas generation resulting from proton reduction and iron corrosion consuming protons may result in an increase of the negative electrolyte pH. The increase in the negative electrolyte pH may concomitantly destabilize the electrolyte in the redox battery flow system, resulting in further battery charge capacity and efficiency losses.

An approach that addresses electrolyte rebalancing issues that may be caused by the hydrogen gas generation in the redox flow battery system may include catalytically reducing imbalanced $Fe^{3+}$ in the positive electrolyte with the hydrogen gas generated from the side reactions. As such, and referring now to FIG. 3, a flow chart of a method 300 for rebalancing electrolytes in a redox flow battery system (e.g., via one or more electrolyte rebalancing reactors included therein) is depicted. Method 300 will be described with reference to the embodiment provided hereinabove, though it may be understood that similar methods may be applied to other systems without departing from the scope of this disclosure. For example, method 300 may be executed by the redox flow battery system 10 of FIG. 1. Specifically, method 300 may be carried out via the controller 88, and may be stored as executable instructions at a non-transitory storage medium (e.g., memory). Further components described with reference to FIG. 3 may be examples of corresponding components of the redox flow battery system 10 of FIG. 1. In one embodiment, method 300 may partially or wholly substitute 222 in method 200 as described in detail above at FIG. 2. However, it will be appreciated that the method 300 constitutes one exemplary embodiment of electrolyte rebalancing and that additional or alternative electrolyte rebalancing methods may be implemented within the scope of this disclosure.

At 302, method 300 may include determining or measuring or estimating one or more operating conditions of the redox flow battery system (e.g., 10). As described above at 202 of FIG. 2, the controller (e.g., 88) may determine one or more of electrolyte chemical properties including pH, battery SOC, electrolyte concentrations (e.g., concentration of $Fe^{3+}$, $Fe^{2+}$, etc.), electrolyte SOC, power module voltage, DC current, pump activity (e.g., electrolyte pump ON/OFF statuses, electrolyte pump flow rates, pump timers, and the like), electrolyte temperatures, power (including current and voltage) supplied to the power module, internal power demand set points, external power demand set points, battery charge capacity, and the like. Various operating conditions may be indicated (e.g., determined, measured, estimated) by feedback from one or more sensors (e.g., 60, 62, 70, 72) of the redox flow battery system. As one example, the battery SOC may be determined using an optical sensor, the pH may be measured using a pH meter, and the electrolyte concentrations may be monitored using an ORP meter for measuring electrolyte potential.

At 304, method 300 may include directing hydrogen gas from the negative and positive electrodes (e.g., 26, 28) to a catalyst surface (e.g., on a packed catalyst bed). As an example, hydrogen gas which may be generated at the negative electrode from one or more side reactions (e.g., proton reduction, iron corrosion) may be directed to the catalyst surface via the electrolyte pumps (e.g., 30, 32). As a further example, hydrogen from an external source may be directed to the catalyst surface. The catalyst surface may include catalyst surfaces of a packed catalyst bed and/or a catalyst layer positioned between the separator (e.g., 24) and the negative electrode. In examples wherein the catalyst surface includes the catalyst layer, the catalyst layer may be positioned relative to the negative electrode and/or the positive electrode so that the hydrogen gas may be directed, or may be self-directed (e.g., hydrogen gas may rise), to the catalyst surface. Other catalyst surfaces which catalyze hydrogen reduction of $Fe^{3+}$ may be employed. For instance, in examples wherein the catalyst surface includes catalyst surface of a packed catalyst bed, the packed catalyst bed may be included within a reactor type other than a trickle bed reactor.

At 306, method 300 may include directing the electrolyte to the catalyst surface. The electrolyte may include a positive electrolyte and/or a negative electrolyte, and the electrolyte may include one or more metal ions. The electrolyte may be directed to the catalyst surface via the electrolyte pumps (e.g., 30, 32). As a further example, electrolytes may be directed to the catalyst surface from an external source. As a further example, the catalyst surface may be positioned relative to the negative electrode (e.g., 26) and/or the positive electrode (e.g., 28) so that the electrolyte may be directed, or may be self-directed (e.g., the electrolyte may gravity flow), to the catalyst surface.

At 308, method 300 may include fluidly contacting the hydrogen gas with the electrolyte at the catalyst surface. As an example, fluidly contacting the hydrogen gas with the electrolyte at the catalyst surface may include mixing the hydrogen gas with a liquid electrolyte and injecting a resultant gas-liquid mixture at the catalyst surface including, for example, the packed catalyst bed of the trickle bed reactor. As a further example, fluidly contacting the hydrogen gas with the electrolyte at the catalyst surface may include positioning the catalyst surface relative to the negative and/or positive electrode wherein the hydrogen gas and the electrolyte are each directed to, and fluidly contact each other at, the catalyst surface.

At 310, method 300 may include determining whether a change in pH is detected, for example, to control a negative electrolyte pH within a predetermined range. Determining the pH change may include measuring the pH change with a pH meter or other sensor and/or probe positioned, for example, at the redox flow battery cell (e.g., 18) or electrolyte source (such as sensors 60, 62, 70, and/or 72). Detecting the pH change may include detecting a pH increase or a pH decrease. Furthermore, detecting the pH change may include detecting the pH increase or the pH decrease beyond a first pH range or a second pH range. For example, in an IFB, the first pH range may be from 3 to 4, corresponding to a pH range over which the negative electrolyte is stable, and the second pH range may be from 1 to 2, corresponding to a pH range over which the positive electrolyte is stable. As another example, the first pH range may correspond to a pH less than 4. The first pH range and the second pH range may be predetermined depending on a configuration of the redox flow battery system (e.g., 10). For example, a Pourbaix diagram may be used to predetermine the first pH range and the second pH range for the redox flow battery system.

If the pH change is not detected, for example, if the negative electrolyte pH is within the predetermined range, method 300 may proceed to 312 to determine whether an electrolyte SOC imbalance is detected. Detecting the electrolyte SOC imbalance may include measuring a change in one or more electrolyte SOC values. For example, if a total concentration of $Fe^{3+}$ ions in the positive electrolyte, indicated by an ORP thereof, is substantially imbalanced with a total concentration of $Fe^{2+}$ ions, indicated by an ORP thereof, in the negative electrolyte in the redox flow battery system (e.g., 10), then the electrolyte SOC imbalance may be detected. As a further example, the electrolyte SOC imbalance may be determined by averaging measured electrolyte concentrations or electrolyte SOCs over a predetermined duration. For example, during the predetermined duration at a known charging or discharging current, an exact amount of electrons transferred (in coulombs) may be calculated by multiplying the charging or discharged current (in amperes) by the predetermined duration (in seconds). Based on the total coulombs transferred and positive and negative reactions for the redox flow battery system, changes in amounts of species in the positive and negative electrolytes may be determined. If the measured electrolyte SOC does not balance with charges in the amounts of species calculated from the total coulombs transferred, then the electrolyte SOC imbalance may be determined. If the electrolyte SOC imbalance is not detected, method 300 may then end. If method 300 is being substituted for 222 of method 200, then method 200 may proceed to 224 as described in detail with reference to FIG. 2.

If the pH change is detected, for example, if the negative electrolyte pH is above the predetermined range at 310, or the electrolyte SOC imbalance is detected at 312, method 300 may proceed to 314 to supply hydrogen gas from the external source. For example, in the redox flow battery system (e.g., 10), if the negative electrolyte pH increases beyond the first pH range (e.g., where the $Fe^{3+}$ ions are stable), the hydrogen gas may be supplied (e.g., via the controller 88) to the redox flow battery cell (e.g., 18) to drive $Fe^{3+}$ reduction at the catalyst surface. The hydrogen gas supplied from the external source may increase the partial pressure of the hydrogen gas at the catalyst surface, and may thereby speed up hydrogen reduction of $Fe^{3+}$ at the catalyst surface, producing protons and reducing the positive electrolyte pH. In some examples, the negative electrolyte pH may concomitantly be lowered by hydrogen reduction of $Fe^{3+}$ ions crossing over from the positive electrolyte to the negative electrolyte or by protons, generated at the positive side, crossing over to the negative electrolyte due to a proton concentration gradient and electrophoretic forces. Accordingly, the negative electrolyte pH may be maintained within a stable region, while reducing the risk of precipitation of $Fe^{3+}$ ions crossing over from a positive electrode compartment (e.g., 22) as $Fe(OH)_3$. The hydrogen gas supplied from the external source may thus increase a rate of $Fe^{3+}$ reduction at the catalyst surface, thereby rebalancing the electrolyte SOCs of the positive and negative electrolytes.

Referring now to FIG. 4, an example timeline 400 depicting a first example of battery cycling following iron preformation at a negative electrode of a redox flow battery system is shown. Specifically, during system conditioning, both iron preformation and subsequent electrolyte rebalancing are employed to optimize electrochemical performance of the redox flow battery system. For example, and as discussed below with reference to FIG. 5, optimizing the electrochemical performance may include improving the battery charge capacity of the redox flow battery system, thereby prolonging useful cycle life. The iron preformation and the electrolyte rebalancing may result from one or more control schemes executed by a controller, such as the methods 200 and 300 respectively described above with reference to FIGS. 2 and 3.

Timeline 400 depicts an electrolyte storage tank pressure at solid curve 401, a DC current during charging at solid curve 411, a DC current during discharging at short-dashed curve 412, a system conditioning status at solid curve 421, a battery cycling status at solid curve 531, an idle mode status at solid curve 441, a charging mode status at solid curve 451, a discharging mode status at solid curve 461, an amount of $Fe^{3+}$ at solid curve 471, and an amount of iron plating at solid curve 481. Additionally, long-dashed curve 402 represents a first threshold pressure, long-dashed curve 403 represents a second threshold pressure, long-dashed curve 413 represents an idle threshold current, and long-dashed curve 472 represents a threshold $Fe^{3+}$ amount. All curves are depicted over time (plotted along an abscissa, where time increases from left to right of the abscissa). Further, a dependent variable represented by each curve discussed above is plotted along a respective ordinate, where the dependent variable increases from bottom to top of the given ordinate (unless otherwise stated or shown).

Between t1 and t2, the redox flow battery system is in the idle mode (curve 441). It will be appreciated that, though the timeline 400 depicts the redox flow battery system in the idle mode immediately prior to system conditioning, the redox flow battery system may be in battery cycling immediately prior to system conditioning.

At t2, the redox flow battery system enters system conditioning (curve 421). As such, the redox flow battery system exits the idle mode (curve 441) and enters the charging mode (curve 451) via an increase in the DC current (curve 411). As a result of charging, $Fe^{3+}$ is generated at a positive electrode of the redox flow battery system, increasing the $Fe^{3+}$ amount (curve 471). Further, $Fe^{2+}$ is reduced at a negative electrode of the redox flow battery system and plated thereon as $Fe^0$; thus, the iron plating amount (curve 481) increases. Additionally, side reactions generating hydrogen gas occur at the negative electrode, resulting in an increase in the electrolyte storage tank pressure (curve 401).

At t3, the electrolyte storage tank pressure (curve 401) reaches the first threshold pressure (curve 402), and the charging mode (curve 451) exits. Correspondingly, the charging DC current (curve 411) is drained and the iron plating ceases (curve 481). Since the redox flow battery system is no longer charging, hydrogen gas generation slows down and the electrolyte storage tank pressure stops increasing. Further, since the charging DC current (curve 411) drains below the idle threshold current (curve 413), the redox flow battery system enters the idle mode (curve 441). During the idle mode (e.g., between t3 and t4), electrolyte rebalancing is initiated, decreasing the $Fe^{3+}$ amount (curve 471) below the threshold $Fe^{3+}$ amount (curve 472) via catalyzed hydrogen reduction. The $Fe^{3+}$ amount being below the threshold $Fe^{3+}$ amount will mitigate further accumulated $Fe^0$ plating during subsequent battery cycling (e.g., following t4). Further, the electrolyte storage tank pressure (curve 401) decreases as the hydrogen gas is consumed in $Fe^{3+}$ reduction.

At t4, the electrolyte storage tank pressure (curve 401) reaches the second threshold pressure (curve 403), and the redox flow battery system exits system conditioning (curve 421) and enter battery cycling (curve 431). Concomitantly, the redox flow battery system exits the idle mode (curve 441). During battery cycling, the redox flow battery system alternates between the charging mode (curve 451) and the discharging mode (curve 461) by respectively applying DC current to charge (curve 411) and discharge (curve 412) the redox flow battery system. Further, electrolyte rebalancing finishes when the redox flow battery system exits system conditioning, and the $Fe^{3+}$ amount (curve 471) accordingly stops decreasing.

During battery cycling (e.g., after t4), each of the $Fe^{3+}$ amount (curve 471) and the iron plating amount (curve 481) oscillates during cycling (e.g., increasing during charging and decreasing during discharging). Further, hydrogen gas generation is less inhibited during battery cycling, resulting in a steady increase in the electrolyte storage tank pressure (curve 401). The redox flow battery system continues battery cycling until system conditioning or the idle mode is re-entered, or until the redox flow battery system is shut down.

Referring now to FIG. 5, an example timeline 500 depicting a second example of battery cycling following iron preformation at a negative electrode of a redox flow battery system is shown. Specifically, optimizing the electrochemical performance may include improving a battery charge capacity of the redox flow battery system during battery cycling by first employing iron preformation and electrolyte rebalancing during system conditioning (as discussed above with reference to FIG. 4). The iron preformation and the electrolyte rebalancing may result from one or more control schemes executed by a controller, such as the methods 200 and 300 respectively described above with reference to FIGS. 2 and 3.

Timeline 500 depicts a battery charge capacity at solid curve 501, a system conditioning status at solid curve 511, a battery cycling status at solid curve 521, an amount of $Fe^{3+}$ at solid curve 531, and an amount of iron plating at solid curve 541. Additionally, dashed curve 502 represents a threshold battery charge capacity and dashed curve 532 represents a threshold $Fe^{3+}$ amount. All curves are depicted over time (plotted along an abscissa, where time increases from left to right of the abscissa). Further, a dependent variable represented by each curve discussed above is plotted along a respective ordinate, where the dependent variable increases from bottom to top of the given ordinate (unless otherwise stated or shown).

Between t5 and t6, the redox flow battery system is in battery cycling (curve 521). During battery cycling, each of the $Fe^{3+}$ amount (curve 531) and the Fe plating amount (curve 541) oscillates during cycling (e.g., increasing during charging and decreasing during discharging). However, over time, the battery charge capacity (curve 501) slowly decreases, resulting at least in part from an overall steady decrease in the iron plating amount (curve 541) and a corresponding overall steady increase in the $Fe^{3+}$ amount (curve 531).

At t6, the battery charge capacity (curve 501) reaches the threshold battery charge capacity (curve 502) and the redox flow battery system exits battery cycling (curve 521) and enters system conditioning (curve 511). During system conditioning (e.g., between t6 and t7), the battery charge capacity significantly increases, due to iron preformation increasing the iron plating amount (curve 541) and subsequent electrolyte rebalancing decreasing the $Fe^{3+}$ amount (curve 531) below the threshold $Fe^{3+}$ amount (curve 532). The $Fe^{3+}$ amount being below the threshold $Fe^{3+}$ amount will mitigate further accumulated $Fe^0$ plating during subsequent battery cycling (e.g., following t7).

At t7, the redox flow battery system exits system conditioning (curve 511) and re-enters battery cycling (curve 521). As such, after t7, the battery charge capacity (curve 501) again slowly decreases, as the iron plating amount (curve 541) oscillates with charging and discharging and steadily decreases over time, and the $Fe^{3+}$ amount (curve 531) oscillates with charging and discharging and steadily increases over time. The redox flow battery system continues battery cycling until system conditioning or the idle mode is re-entered, or until the redox flow battery system is shut down.

Figure 6A:
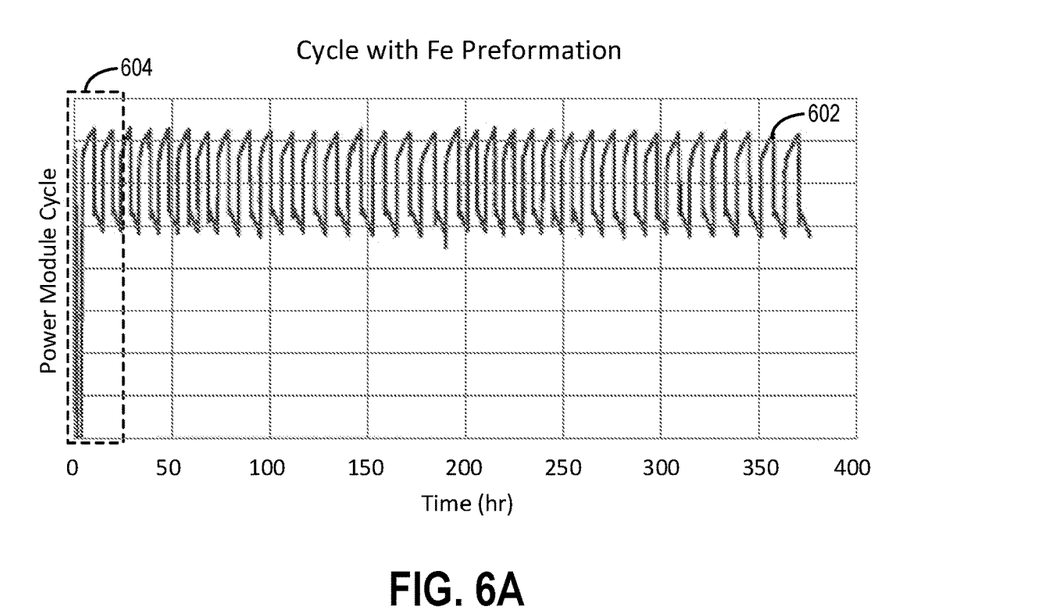
FIGS. 6A and 6B show example plots of voltage over battery cycling following iron preformation at the negative electrode of the redox flow battery system.
Figure 6B:
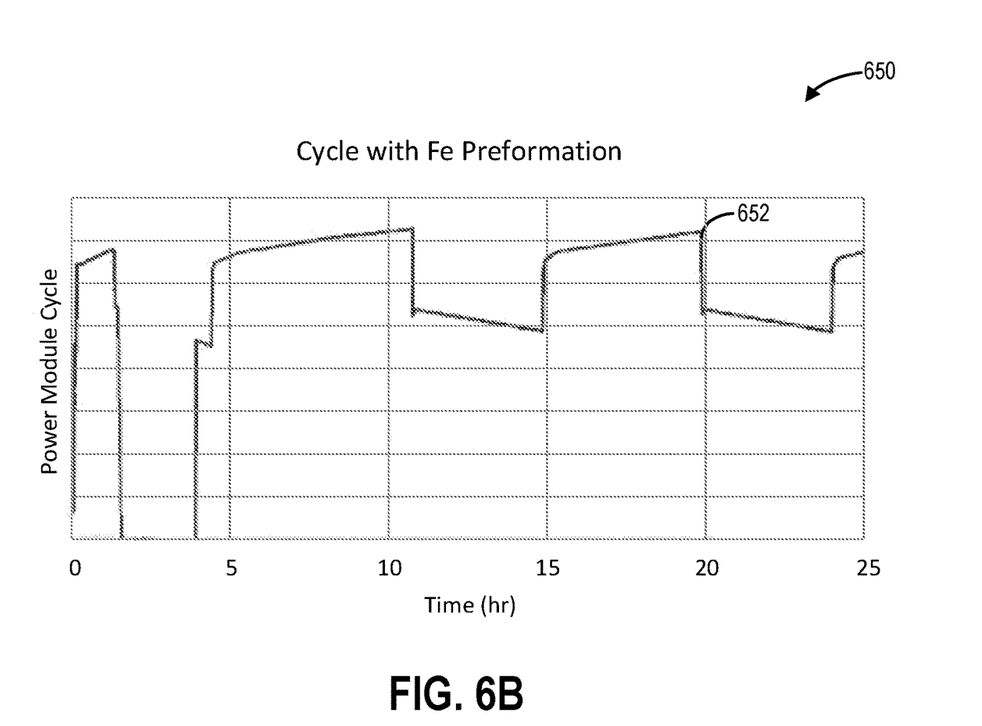

Referring now to FIGS. 6A and 6B, example plots 600 and 650 of power module voltage over battery cycling following iron preformation at a negative electrode of a redox flow battery system are respectively shown. It will be appreciated that the plot 650, shown at FIG. 6B, represents an enlarged portion of the plot 600, shown at FIG. 6A, where the enlarged portion is indicated by a dashed box 604. As shown by curves 602 and 652, a significant drop in the power module voltage indicates current drain following the iron preformation, allowing the redox flow battery system to enter an idle mode and initiate electrolyte rebalancing. A combined effect of the iron preformation and the electrolyte rebalancing results in sustained capacity retention over subsequent battery cycling, as shown by curve 602. In this way, electrochemical performance of the redox flow battery system may be optimized by employing iron preformation and electrolyte rebalancing prior to battery cycling (e.g., during system conditioning).

In this way, iron may be preformed at a negative electrode of a redox flow battery. The iron preformation may occur during battery charging, and the redox flow battery may then be run in an idle mode to permit electrolyte rebalancing. The technical effect of preforming iron at the negative electrode is that capacity may be increased during subsequent battery cycling, thereby optimizing an electrochemical performance of the redox flow battery. Further, the electrolyte rebalancing may reduce a $Fe^{3+}$ ion concentration, which may further mitigate iron plating loss at the negative electrode.

An example of a method for a redox flow battery comprises, in a first condition, discharging the redox flow battery and then charging the redox flow battery without entering an idle mode of the redox flow battery, and in a second condition, charging the redox flow battery, including preforming an iron plating amount at a negative electrode of the redox flow battery, and thereafter entering the idle mode including adjusting each of an electrolyte pH and an electrolyte state of charge (SOC) imbalance. A first example of the method further comprises, in a third condition, charging the redox flow battery and then discharging the redox flow battery without entering the idle mode. A second example of the method, optionally including the first example of the method, further comprises determining whether a threshold degradation level of the redox flow battery is met, responsive to the threshold degradation level of the redox flow battery being met, entering the second condition, and responsive to the threshold degradation level of the redox flow battery not being met, determining an SOC of the redox flow battery, responsive to the SOC being greater than or equal to a threshold SOC, entering the first condition, and responsive to the SOC being less than the threshold SOC, entering the third condition. A third example of the method, optionally including one or more of the first and second examples of the method, further comprises, in the second condition, determining the iron plating amount preformed at the negative electrode during charging of the redox flow battery, and responsive to the iron plating amount being less than a threshold amount, continuing charging the redox flow battery to preform a further iron plating amount. A fourth example of the method, optionally including one or more of the first through third examples of the method, further includes wherein determining the iron plating amount includes determining one or more of a ferric iron electrolyte concentration and a previous cycling efficiency of the redox flow battery, and inferring the iron plating amount based on the one or more of the ferric iron electrolyte concentration and the previous cycling efficiency of the redox flow battery. A fifth example of the method, optionally including one or more of the first through fourth examples of the method, further includes wherein, in the second condition, charging the redox flow battery includes increasing an electrolyte tank pressure to greater than a first threshold pressure, and entering the idle mode includes decreasing the electrolyte tank pressure to less than a second threshold pressure, the second threshold pressure being less than the first threshold pressure. A sixth example of the method, optionally including one or more of the first through fifth examples of the method, further includes wherein, in the second condition, charging the redox flow battery includes increasing a ferric iron electrolyte concentration by a first amount, and entering the idle mode includes decreasing the ferric iron electrolyte concentration by a second amount, the second amount being greater than the first amount.

An example of a redox flow battery system comprises a redox electrode, a plating electrode, an electrolyte subsystem supplying an electrolyte to each of the redox electrode and the plating electrode, one or more sensors, and a controller operable to receive signals from the one or more sensors and storing executable instructions in non-transitory memory, the instructions executable to determine one or more system conditioning entry conditions based on the signals received from the one or more sensors, and responsive to the one or more system conditioning entry conditions being met, command a charging mode to preform an amount of iron metal at the plating electrode, command an idle mode to balance one or more conditions of the electrolyte subsystem, and further responsive to the amount of iron metal being greater than a threshold amount, enter battery cycling. A first example of the redox flow battery system further includes wherein the idle mode includes operating the redox flow battery system at less than an idle threshold current. A second example of the redox flow battery system, optionally including the first example of the redox flow battery system, further includes wherein the charging mode includes supplying a DC current to the redox electrode to charge the redox flow battery system by oxidizing ferric iron at the redox electrode and reducing ferrous iron to plate the amount of iron metal at the plating electrode. A third example of the redox flow battery system, optionally including one or more of the first and second examples of the redox flow battery system, further includes wherein the one or more system conditioning entry conditions comprise the redox flow battery system reaching a threshold degradation level. A fourth example of the redox flow battery system, optionally including one or more of the first through third examples of the redox flow battery system, further includes wherein determining the one or more system conditioning entry conditions based on the signals received from the one or more sensors includes determining a battery charge capacity based on the signals received from the one or more sensors, and responsive to the battery charge capacity being greater than a threshold battery charge capacity, indicating that the redox flow battery system has reached the threshold degradation level. A fifth example of the redox flow battery system, optionally including one or more of the first through fourth examples of the redox flow battery system, further includes wherein the one or more conditions of the electrolyte subsystem comprise a ferric iron concentration, a positive electrolyte pH, a negative electrolyte pH, and an electrolyte state of charge imbalance. A sixth example of the redox flow battery system, optionally including one or more of the first through fifth examples of the redox flow battery system, further includes wherein the electrolyte subsystem comprises one or more electrolyte balancing reactors, and wherein balancing the one or more conditions of the electrolyte subsystem includes operating the one or more electrolyte balancing reactors to perform catalytic hydrogen reduction of ferric iron to decrease the ferric iron concentration.

An example of a method comprises, during system conditioning of a redox flow battery cell, charging the redox flow battery cell at a set point to increase an electrolyte storage tank pressure, responsive to the electrolyte storage tank pressure being greater than a first threshold pressure, conducting electrolyte rebalancing, and thereafter determining an iron plating amount at a negative electrode of the redox flow battery cell, and responsive to the iron plating amount being less than a threshold amount, continuing charging the redox flow battery cell at the set point. A first example of the method further includes wherein the threshold amount is selected to increase a battery charge capacity above a threshold battery charge capacity. A second example of the method, optionally including the first example of the method, further includes wherein the first threshold pressure is selected to prevent rupture or damage of the redox flow battery cell. A third example of the method, optionally including one or more of the first and second examples of the method, further includes wherein conducting electrolyte rebalancing includes initiating electrolyte rebalancing to decrease the electrolyte storage tank pressure, and responsive to the electrolyte storage tank pressure being less than a second threshold pressure, ending electrolyte rebalancing, wherein the second threshold pressure is selected to indicate that a threshold amount of hydrogen gas has reacted during electrolyte rebalancing. A fourth example of the method, optionally including one or more of the first through third examples of the method, further includes wherein initiating electrolyte rebalancing includes draining a DC current from the redox flow battery cell to end charging, and operating one or more electrolyte rebalancing reactors. A fifth example of the method, optionally including one or more of the first through fourth examples of the method, further includes wherein continuing charging the redox flow battery cell includes reentering charging after ending charging.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a redox flow battery, the method comprising:
   in a first condition, discharging the redox flow battery and then, in response to a battery charge capacity falling below a battery cycling charging threshold, charging the redox flow battery without entering an idle mode of the redox flow battery; and
   in a second condition, in response to the battery charge capacity falling below a system conditioning charging threshold, charging the redox flow battery, including preforming an iron plating amount at a negative electrode of the redox flow battery, and thereafter entering the idle mode, including adjusting each of an electrolyte pH and an electrolyte state of charge (SOC) imbalance, wherein the system conditioning charging threshold is lower than the battery cycling charging threshold.

2. The method of claim 1, further comprising, in a third condition, charging the redox flow battery and then discharging the redox flow battery without entering the idle mode.

3. The method of claim 2, further comprising:
   determining whether a threshold degradation level of the redox flow battery is met;
   responsive to the threshold degradation level of the redox flow battery being met, entering the second condition; and
   responsive to the threshold degradation level of the redox flow battery not being met:
      determining an SOC of the redox flow battery,
      responsive to the SOC being greater than or equal to a threshold SOC, entering the first condition, and
      responsive to the SOC being less than the threshold SOC, entering the third condition.

4. The method of claim 1, further comprising, in the second condition:
   determining the iron plating amount preformed at the negative electrode during charging of the redox flow battery; and
   responsive to the iron plating amount being less than a threshold amount, continuing charging the redox flow battery to preform a further iron plating amount.

5. The method of claim 4, wherein determining the iron plating amount includes:
   determining one or more of a ferric iron electrolyte concentration and a previous cycling efficiency of the redox flow battery; and
   inferring the iron plating amount based on the one or more of the ferric iron electrolyte concentration and the previous cycling efficiency of the redox flow battery.

6. The method of claim 1, wherein, in the second condition:
   charging the redox flow battery includes increasing an electrolyte tank pressure to greater than a first threshold pressure; and
   entering the idle mode includes decreasing the electrolyte tank pressure to less than a second threshold pressure, the second threshold pressure being less than the first threshold pressure,
   wherein the electrolyte tank pressure is increased due to generation of hydrogen gas at a negative electrode of the redox flow battery.

7. The method of claim 1, wherein, in the second condition:
   charging the redox flow battery includes increasing a ferric iron electrolyte concentration by a first amount; and
   entering the idle mode includes decreasing the ferric iron electrolyte concentration by a second amount, the second amount being greater than the first amount,
   wherein the ferric iron electrolyte concentration is decreased by employing a catalytic electrolyte rebalancing subsystem to supply hydrogen gas to reduce ferric iron to ferrous iron.

8. The method of claim 2, wherein preforming an iron plating amount in the second condition includes raising the SOC of the redox flow battery at a rate that is faster than a rate of SOC increase during the first condition or the third condition.

* * * * *